United States Patent [19]

Yamaguchi

[11] Patent Number: 4,996,549
[45] Date of Patent: Feb. 26, 1991

[54] FILM FEEDING CONTROL DEVICE FOR CAMERA

[75] Inventor: Kohichi Yamaguchi, Hachioji, Japan
[73] Assignee: Konica Corporation, Tokyo, Japan
[21] Appl. No.: 406,067
[22] Filed: Sep. 12, 1989
[30] Foreign Application Priority Data Sep. 13, 1988 [JP] Japan .................................. 63-227465

[51] Int. Cl.$^5$ .......................... G03B 1/18; G03B 17/36
[52] U.S. Cl. ............................... 354/173.11; 354/217; 250/561
[58] Field of Search ....................... 354/173.1, 217, 21, 354/173.11; 250/561, 559, 571

[56] References Cited

U.S. PATENT DOCUMENTS

| | | | |
|---|---|---|---|
| 4,431,292 | 2/1984 | Takahashi | 354/173.11 |
| 4,482,227 | 11/1984 | Shiozawa et al. | 354/173.11 |
| 4,772,800 | 9/1988 | Kanai et al. | 250/561 |

Primary Examiner—L. T. Hix
Assistant Examiner—Cassandra C. Spyrou
Attorney, Agent, or Firm—Finnegan, Henderson, Farabow, Garrett, and Dunner

[57] ABSTRACT

A film feeding control device for a camera in which film perforations are arranged so as to pass through a detecting section of a photointerrupter during film feeding, which detects the presence of perforations by comparing an output signal from the photointerrupter when the perforations pass through the detecting section with a predetermined threshold limit value and which detects film feeding conditions according to the variation of the output signal, characterized in that the device includes: (i) calculating means for calculating an average value from maximum and minimum values of the output signal from the photointerrupter; (ii) judging means for establishing the average value as the threshold limit value and for discriminating the film feeding condition by comparing the output signal from the photointerrupter with the threshold limit value; and (iii) controlling means for controlling the feed of film according to the judged result by the judging means.

3 Claims, 5 Drawing Sheets

FILM FEEDING CONTROL DEVICE FOR CAMERA

BACKGROUND OF THE INVENTION

The present invention relates to a film feeding control device for camera.

Various methods have been known heretofore in which a film loaded in a camera is fed frame by frame for each completion of photographing. In one of these methods, a sprocket is provided to engage with the perforations located on the side of a film, and the film is fed frame by frame by turning the sprocket by a specified angle through film advance operation.

On the other hand, an electrically film-winding type a camera has recently been commercially available in which film winding is performed by motor drive, not by manual operation. Such camera employs a method in which the feed of one film frame is controlled by detecting optically the number of perforations.

That is, the method is such that a film feeding path is provided with a photointerrupter in which a light beam is applied to the position through which the perforations pass and the reflection or permeation of the beam is optically detected, and the resultant output is compared with a predetermined threshold limit value and then a motor is allowed to stop based on the compared result so as to control the feed of one film frame (for example, Japanese Pat. laid open No. 2296/1987).

However, where a reflection type photointerrupter is used in such feeding control systems, a different reflection coefficient due to individual film properties or a change of the supply voltage to the photointerrupter with a decrease of battery voltage causes the output of the photointerrupter to be changed, so that the setting of the threshold limit value may become difficult or in some case become impossible.

SUMMARY OF THE INVENTION

It is an object of the present invention, which has been devised with respect to the above-mentioned points, to allow precise film feeding control even if films have different reflection coefficient or permeability from each other, or if the supply voltage to a photointerrupter fluctuates. In order to attain the object, the present invention is arranged such that an average value is calculated from both the maximum and the minimum value of the output signal from the photointerrupter, then the average value is established as a threshold limit value, and the threshold limit value is compared with the output signal from the photointerrupter to judge the presence of perforations so that the feed of film is controlled based on the judged result.

DETAILED DESCRIPTION OF THE PREFERRED EMBODIMENTS

With reference to drawings, the present invention is described hereinafter.

Figure 1:
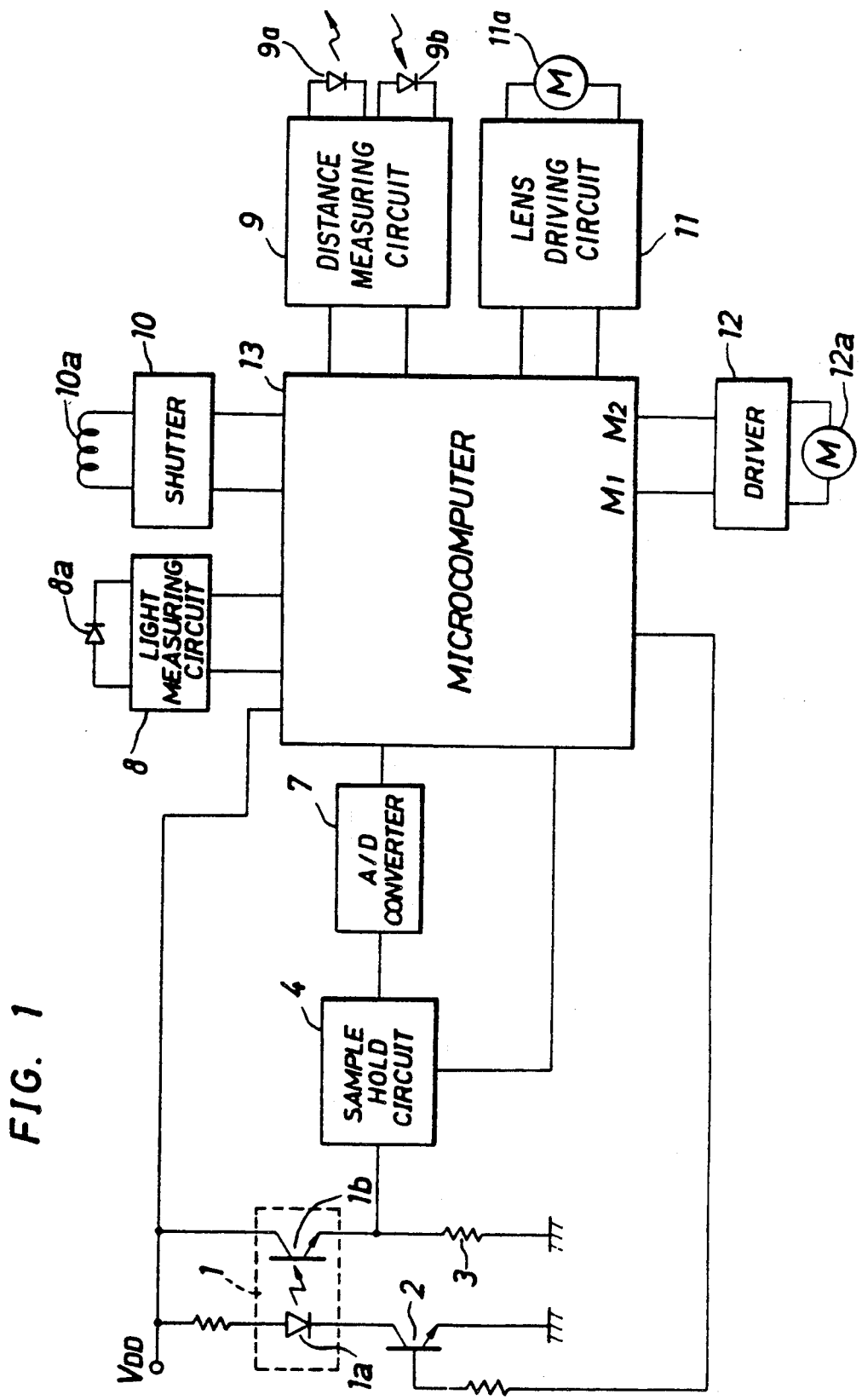
FIG. 1 is a block diagram of the control circuit for the camera assembly employing a film feeding control system according to the present invention.

FIG. 1 is a block diagram of the control circuit for the camera assembly employing a film feeding control system according to the present invention.

Figure 2:
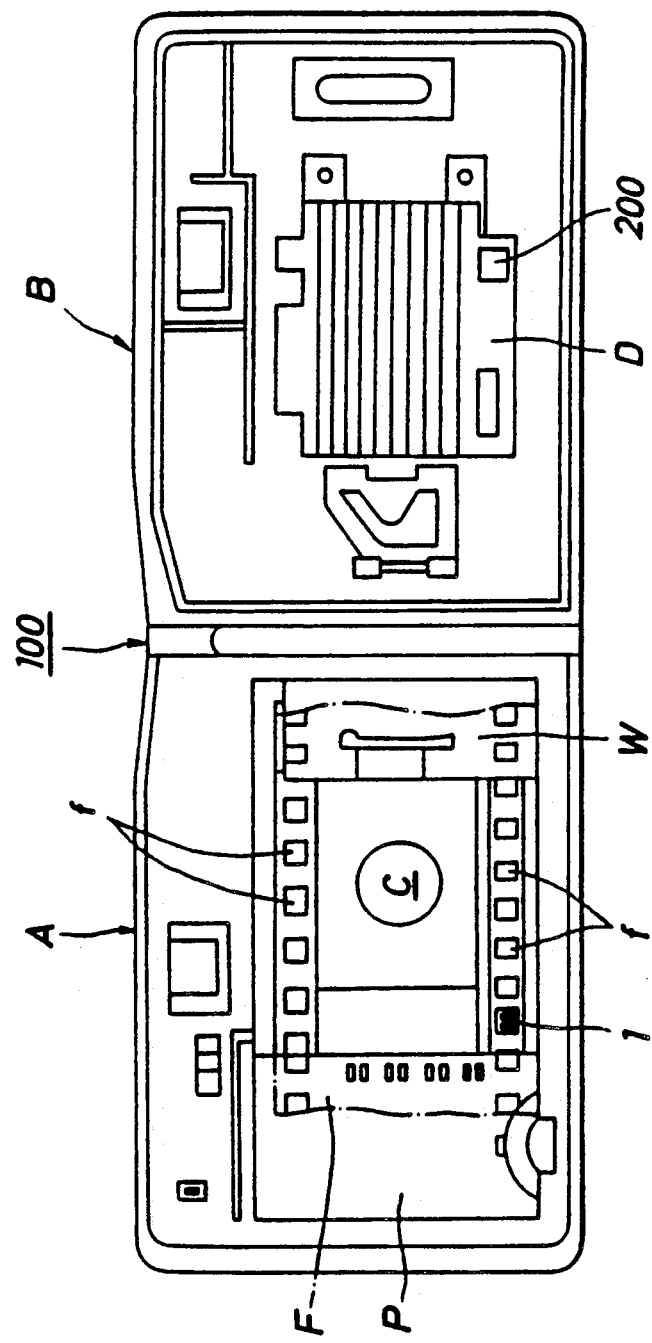
FIG. 2 is a drawing illustrating an opened camera back cover state to show the installing position of a photointerrupter.

In FIG. 1, the numeral 1 indicates a reflection type photointerrupter, comprising a light emitting diode $1a$ and a phototransistor $1b$, which detects optically the presence of film perforations and is located on the passing position of perforations f on a film F (shown with chain line) loaded in a camera body A as shown in FIG. 2 where a back cover B of a camera assembly 100 is opened. Also, in FIG. 2, part of the camera body A is formed with a sprocket housing P and with a take-up reel W which is located across an exposure window C from the housing.

On the other hand, the back cover B is provided with a pressure plate D for holding a film at the position corresponding to the exposure window C when the back cover is closed. The pressure plate D is provided with an antireflection material 200 at the position corresponding to the photointerrupter 1 when the back cover B is closed.

Referring again to FIG. 1, the numeral 2 is a transistor for controlling the ON/OFF of the light emitting diode $1a$ in the photointerrupter 1; the numeral 3 is a resistor which is connected in series to the phototransistor $1b$; the numeral 4 is a sample hold circuit which is controlled by a microcomputer described later; the numeral 7 is an A/D converter for A/D converting the output from the photointerrupter 1 held by the sample hold circuit 4; the numeral 8 is a light measuring circuit for measuring the brightness of a subject using a light receiving element $8a$ such as a silicon photodiode; the numeral 9 is a distance measuring circuit for measuring a distance to a subject using an infrared light emitting diode $9a$ to generate an infrared light toward the subject and using a divided photodiode $9b$ to receive an infrared light reflected from the subject; the numeral 10 is a shutter whose opening is driven by a magnetic coil $10a$; the numeral 11 is a lens driving circuit for driving a photographing lens driving motor $11a$; the numeral 12 is a driver for driving a film winding motor $12a$; and the numeral 13 is a microcomputer for controlling the drive of the shutter 10 and the lens driving motor $11a$ according to the signal from the light measuring circuit 8 and the distance measuring circuit 9, and for controlling the rotation and stoppage of the winding motor $12a$ according to the output signal from the photointerrupter 1.

Figure 3:
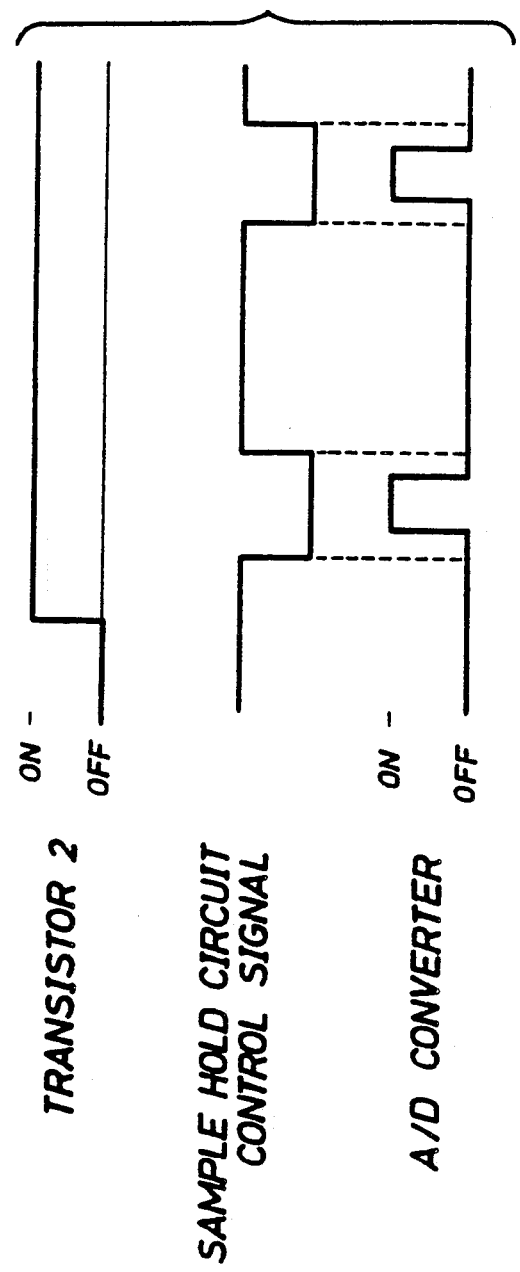
FIG. 3 is a timing chart for reading film perforation information by a photointerrupter.

The ON/OFF of the light emitting diode $1a$ in the photointerrupter 1 is controlled by the transistor 2 which is controlled with ON/OFF by such signal from the microcomputer 13 as shown in FIG. 3, and the output signal from the photointerrupter 1 is held by the sample hold circuit 4 to be A/D converted by the A/D converter 7. FIG. 3 shows a timing chart for reading film perforation information by the photointerrupter 1.

The principle of perforation detection by the photointerrupter 1 is described hereinafter referring to FIG. 4.

Figure 4:
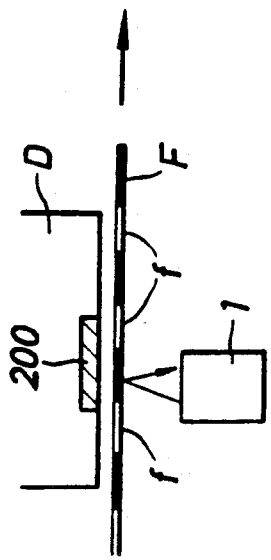
FIG. 4 is a drawing explaining the principle of film perforation detection by a photointerrupter.

FIG. 4 shows a state in which the film F is loaded with the back cover closed.

A light beam from the photointerrupter 1 is reflected by the film portion between the perforation f and perforation f and then received by the photointerrupter 1 which in turn outputs a signal "H".

On the other hand, when the perforation f reaches the position of the photointerrupter 1 with the film F slightly moved in the arrow direction, the light beam from the photointerrupter 1 passes through the perforation f and is absorbed by the antireflection material 200, with the result that no beam returns to the photointerrupter 1. At this point, the photointerrupter 1 outputs a signal "L".

Thus, the photointerrupter 1 outputs the signals "H" and "L" alternately with each other according to the feed of the film F.

With reference to the FIG. 4, the film feeding control in a series of photographing actions of the camera according to the present invention is described hereinafter. The camera illustrated here is a type of automatic film loading.

Figure 5A:
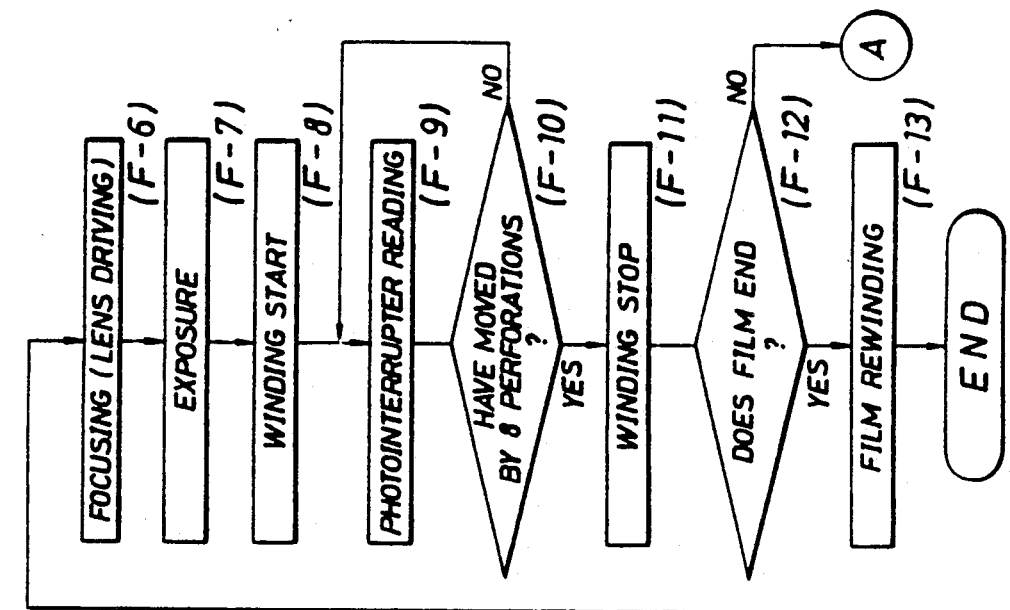
FIG. 5A is a flowchart of photographing actions of the camera and FIG. 5B is a flowchart of automatic film loading subroutine.
Figure 5A:
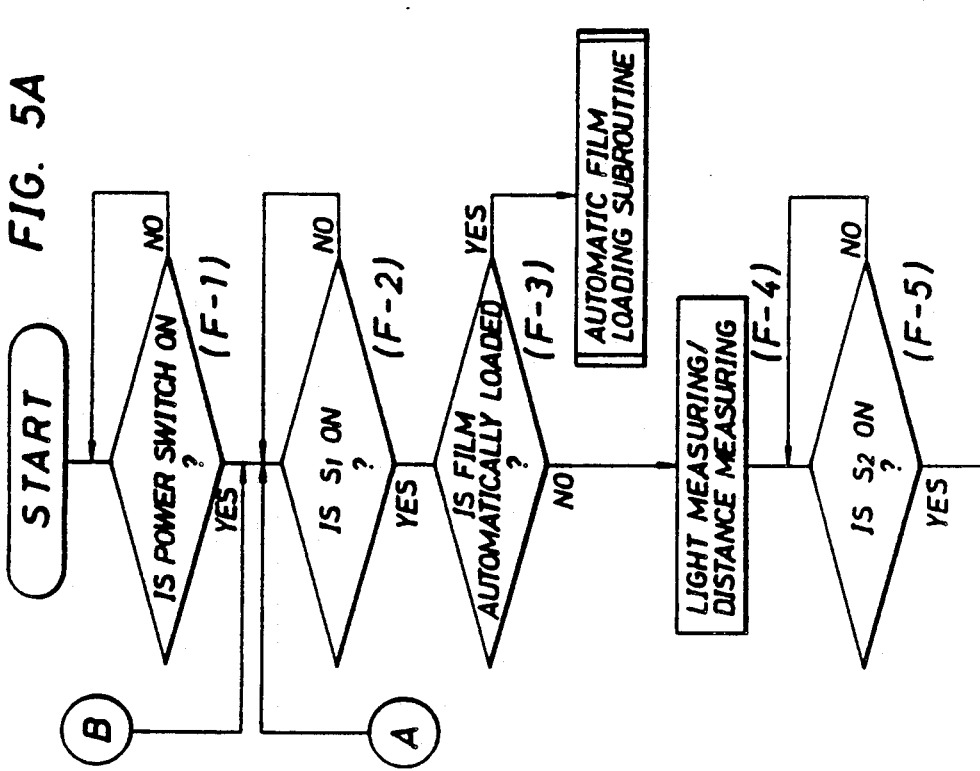
Figure 5B:
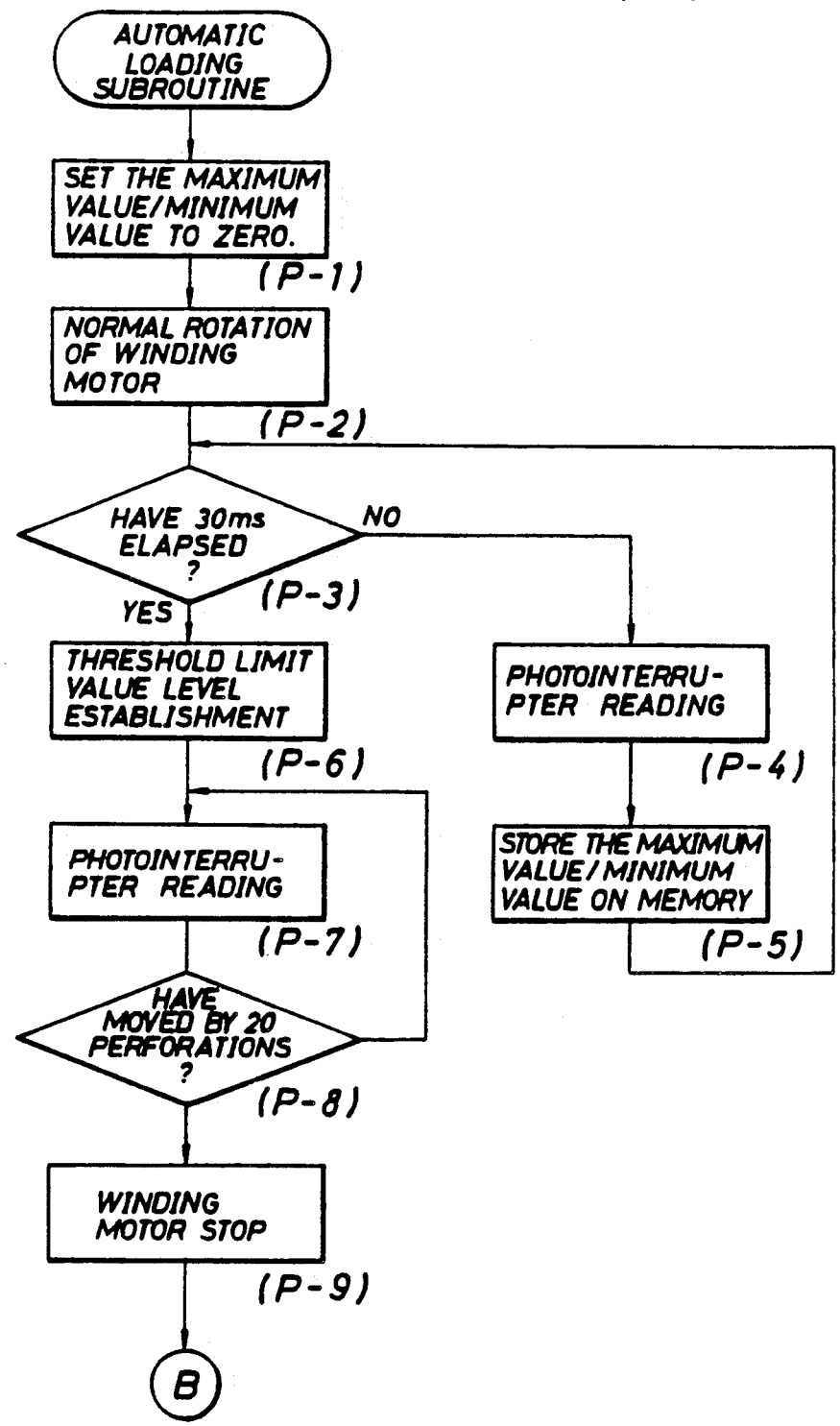

FIG. 5A shows a flowchart of a series of photographing actions and FIG. 5B shows a flowchart of automatic film loading.

With reference to FIG. 5A, photographing action of the camera is first described hereinafter.

When turning on a power switch provided on the camera (F-1), power is supplied to the microcomputer 13 and each circuit shown in FIG. 1. Thereafter, when depressing a release button, a first step switch $S_1$ turns on (F-2), and then whether a film has just been loaded or not is discriminated according to the frame-counter value stored in the microcomputer and to a back cover opening signal, and if so, automatic film loading is allowed to start (F-3). The automatic film loading action will be described later referring to FIG. 5B. Assuming that automatic film loading has been completed, when the release button is being depressed at the step (F-2), light measuring and distance measuring actions are performed by the light measuring circuit 8 and the distance measuring circuit 9 (F-4).

When the release button is further depressed after the completion of the light measuring and the distant measuring actions, a second step switch $S_2$ turns on (F-5), with the result that through the command from the microcomputer 13 and according to distance measuring information, the motor 11a is rotated by the lens driving circuit 11 to move a photographing lens to a focus position (F-6), and according to light measuring information, an aperture is controlled and the shutter is opened (exposed) to effect photographing (F-7).

After photographing has been completed, the winding motor 12a rotates by the command from the microcomputer 13 to feed the film by one frame (F-8). The commands given to the driver 12 by the microcomputer 13 to perform film winding are, for example, as follows:

| | Microcomputer port | | | |
|---|---|---|---|---|
| $M_1$ | ON | OFF | ON | OFF |
| $M_2$ | OFF | ON | ON | OFF |
| Motor | Normal rotation | Reverse rotation | Brake | Free |

At this point, the microcomputer 13 reads the output signal from the photointerrupter 1 (F-9), discriminates whether the film moves by 8 perforations corresponding to one frame (F-10), and when detecting the output signal for 8 perforations, outputs said command signals ($M_1$=ON, $M_2$=ON) to stop the winding motor 12a (F-11). The threshold limit value in detecting the number of perforations according to the output signal from the photointerrupter 1 at said step (F-10) is determined as described later.

The actions of said steps (F-2) through (F-11) are repeated for each photographing, and whether the photographing with a specified number of pictures (number of frames) has been completed or not is discriminated (F-12), and when the photographing have been completed the winding motor 12a is allowed to rotate reversely ($M_1$=OFF, $M_2$=ON) to rewind the film (F-13). The above actions are a series of photographing actions.

With reference to FIG. 5B, automatic film loading action is described hereinafter.

When automatic film loading is discriminated at the step (F-3), the maximum and minimum values remaining on the memory in the microcomputer are set to zero (P-1), then the command ($M_1$=ON, $M_2$=OFF) from the microcomputer 13 is outputted to the drive 12 to rotate normally the winding motor 12a (P-2). As a result, film feeding starts, while the microcomputer 13 reads the output signal from the photointerrupter 1 (P-4) for a predetermined time between several milliseconds and several tens milliseconds from the start of feeding (for example, 30 milliseconds) (P-3), and stores the maximum and minimum values on the memory thereof (P-5). In this case, the maximum value refers to the one which is rewritten whenever the microcomputer encounters a value exceeding the previous value to indicate the maximum up to that time, and the minimum value refers to the one which is rewritten whenever it encounters a value being less than the previous value to indicate the minimum up to that time.

After a specified time (30 milliseconds in the above example) has lapsed, the microcomputer 13 calculates an average or intermediate value between the maximum and minimum values (through a simple calculation of (the maximum value+the minimum value) /2), stores the intermediate value, and establishes the value as the threshold limit value to determine the presence of perforations (P-6).

Thereafter, the microcomputer 13 reads the output signal from the photointerrupter 1 (P-7), discriminates whether a film length corresponding to 20 perforations (the number of perforations corresponding to approx. 2.5 frames required for automatic loading) has been fed or not by comparing with the threshold limit value established above (P-8), and when the length has been fed, outputs the command ($M_1$=ON, $M_2$=ON) to stop the winding motor 12a (P-9).

Thus, during automatic film loading, an intermediate value is determined from the maximum and minimum values of the output signal from the photointerrupter 1, and the intermediate value is used as the threshold limit value which becomes a reference value for discriminating the number of perforations at the step (F-10) during subsequent photographing. That is, when the output signal from the photointerrupter 1 is less than the intermediate value, the signal is judged to indicate perforation ("L") and when the signal is more than the value, it is judged to indicate no perforation ("H"), so that the number of perforations can be known by the number of "L"s.

Although, in said embodiment, the threshold limit value to detect the perforations has been established utilizing the period of automatic film loading, the present invention can also apply to a camera without automatic film loading function, in which the same effect can be obtained by utilizing the period of film winding for initial one to two frames.

Since the threshold limit value calculation described above is performed for each film winding, even if the reflection coefficient or the permeability varies with film, or supply voltage fluctuates, the threshold limit value is determined by incorporating these parameters each time, so that there is no adverse effect on the detection of perforations.

As described above, the present invention is arranged such that an average value is calculated from the maximum and minimum values of the output signal from a photointerrupter, the average value being established as a threshold limit value, and the presence of perforations is judged by comparing the output signal from the photointerrupter with the threshold limit value, and then the feed of film is controlled based on the judged result. Accordingly, regardless of the decrease of the output signal from the photointerrupter due to difference in reflection coefficient or permeability for each film, or to the fluctuation in supply voltage, the perforations can be precisely detected at all times, allowing a precise film feeding.

As will be understood by those familiar with the art, the present invention may be embodied in other specific forms without departing from the spirit or essential characteristics thereof. Accordingly, the disclosure of the preferred embodiments of the present invention is intended to be illustrative, but not limiting, of the scope of the invention which is set forth in the following claims.

What is claimed is:

1. A film feeding control device for a camera in which film perforations are arranged so as to pass through a detecting section of a photointerrupter during film feeding, which detects presence of perforations by comparing an output signal from the photointerrupter when the perforations pass through the detecting section with a predetermined threshold limit value and which detects film feeding conditions according to the variation of the output signal, characterized in that said device comprises:

calculating means for calculating an average value from maximum and minimum values of the output signal from said photointerrupter;

judging means for establishing said average value as the threshold limit value and for discriminating the film feeding condition by comparing the output signal from said photointerrupter with said threshold limit value; and controlling means for controlling the feed of film according to the judged result by said judging means.

2. A device as in claim 1, wherein sampling of the output signal from the photointerrupter to calculate said average value is performed during automatic film loading action.

3. A device as in claim 1, wherein sampling of the output signal from the photointerrupter to calculate said average value is performed during initial film winding.

* * * * *